United States Patent [19]

Billion

[11] Patent Number: 4,634,881

[45] Date of Patent: Jan. 6, 1987

[54] APPARATUS FOR DETECTING IMPURITIES IN TRANSLUCENT BODIES

[75] Inventor: Leo Billion, Herent, Belgium

[73] Assignee: Supernova Systems, Inc., Sioux Falls, S. Dak.

[21] Appl. No.: 750,872

[22] Filed: Jun. 28, 1985

Related U.S. Application Data

[63] Continuation of Ser. No. 440,374, Nov. 9, 1982, abandoned.

[51] Int. Cl.[4] ........................ G01N 21/88; B07C 5/342

[52] U.S. Cl. .................................... 250/572; 209/585; 209/587

[58] Field of Search ............... 209/552, 559, 576, 577, 209/578, 579, 585, 587, 588; 356/433–435; 250/578, 562, 563, 572; 83/364, 365, 371

[56] References Cited

U.S. PATENT DOCUMENTS

| | | | |
|---|---|---|---|
| 3,011,634 | 12/1961 | Hutter et al. | 209/578 X |
| 3,028,960 | 4/1962 | Currie et al. | 209/587 X |
| 3,230,305 | 1/1966 | Kendrick | 209/578 X |
| 3,854,586 | 12/1974 | Perkins, III | 209/581 X |
| 4,224,849 | 9/1980 | Loser | 83/371 X |
| 4,284,357 | 8/1981 | Kudo | 250/563 X |
| 4,348,593 | 9/1982 | Seachman | 250/578 |

FOREIGN PATENT DOCUMENTS

| | | | |
|---|---|---|---|
| 2429624 | 1/1980 | France | 209/579 |

*Primary Examiner*—Robert B. Reeves
*Assistant Examiner*—Glenn B. Foster
*Attorney, Agent, or Firm*—Alan H. Levine

[57] ABSTRACT

An apparatus including a source for producing a concentrated light beam, such as a laser, a background spaced from the source against which the light beam is directed, and a transport arrangement for moving translucent bodies, such as French cut potatoes, through the light beam. Another light source illuminates the background independently of the concentrated light beam. A receiver receives light reflected from the background and from translucent bodies moving through the light beam, as well as from the independent light source illuminating the background. The receiver produces an output signal which changes when an impurity enters the concentrated light beam, and this changed signal is used to operate a device which removes the impurity from the remainder of the translucent bodies. The light beam may be scanned across a plurality of rows of moving bodies by directing the beam at a rapidly rotating multifaceted mirror. Circuitry is employed to indicate which row contains the sensed impurity so as to direct the appropriate impurity-removing device to operate.

2 Claims, 8 Drawing Figures

FIG. 2
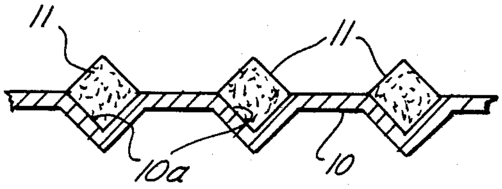
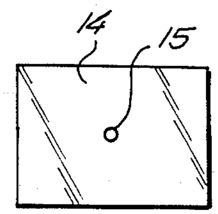
FIG. 3
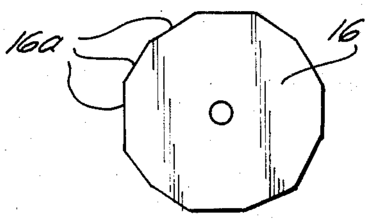
FIG. 4
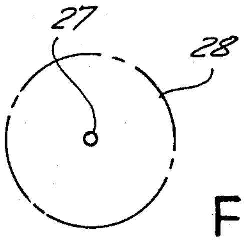
FIG. 5
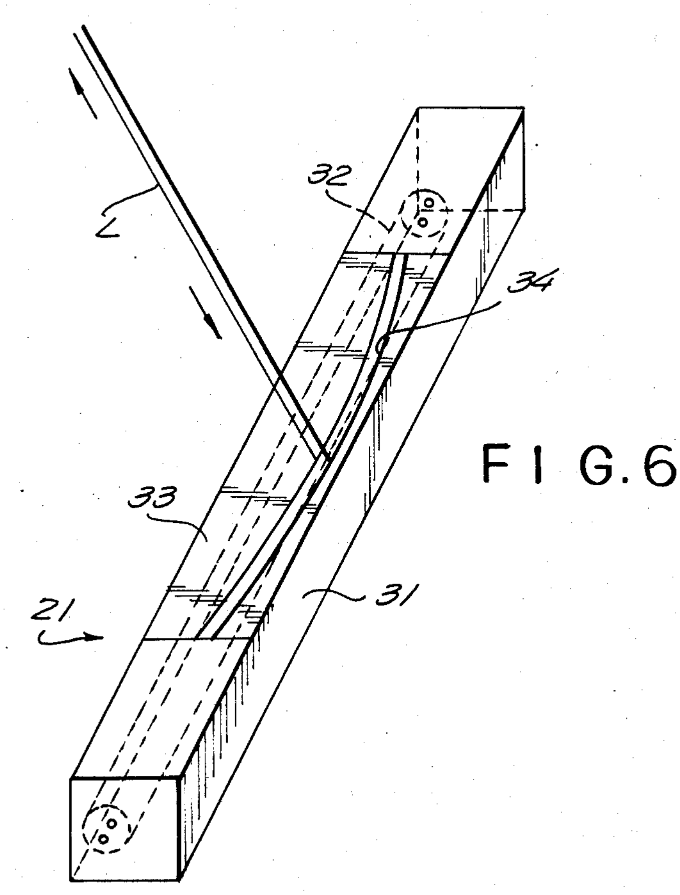
FIG. 6

APPARATUS FOR DETECTING IMPURITIES IN TRANSLUCENT BODIES

This application is a continuation of application Ser. No. 440,374, filed Nov. 9, 1982 now abandoned.

This invention relates to detecting impurities in translucent bodies, and removing from a mass of such bodies those in which impurities are detected, or alternatively removing the detected impurities from the bodies in which they are found.

The invention finds particular utility in detecting impurities, i.e., relatively opaque discolorations, in French cut potatoes, i.e., raw potatoes cut into strips which after being deep fried become French fried potatoes. Therefore, although the invention has other applications as well, it will be described with reference to French cut potatoes.

When raw potatoes are French cut, the individual strips are translucent, or vitreous in nature, particularly when exposed to a high intensity light beam. However, impurities in some of the potato strips, caused for example by the eyes of the potatoes, tend to be dryer, darker in color, and more opaque, than the surrounding potato material. It is desirable to remove the potato strips containing such impurities from the remainder of the strips, or to cut the impurities out of the strips carrying them, prior to cooking the potato strips into French fries.

On a commercial basis, potatoes are peeled and French cut automatically in great quantities, after which they are processed further, e.g., packaged and frozen. It is common practice to spread the potatoes out on inspection tables, after peeling but before cutting, where inspectors reject potatoes with defects, or cut defects out of them by hand. After being French cut, the potato strips are inspected again, but this is no more than a cursory inspection. This practice is obviously time consuming, expensive, and inefficient.

It has been suggested that after cutting, the potato strips be scanned piece-by-piece, as by a camera, to detect impurities. However, cameras and other scanning devices employed thus far have slow response times, limiting the capacity of the detection equipment, they are not precise enough to recognize very small impurities, and they require a lot of light which creates undesirable shadow effects.

It is an object of the present invention to provide an apparatus for detecting impurities in translucent bodies, such as French cut potatoes, which permits high speed scanning of the individual potato strips, is extremely accurate, enabling detection of even small impurities, and does not require a high level of ambient light.

The invention is predicated on a realization that when a concentrated light beam impinges upon a French cut potato strip, the light diffuses into the translucent potato so that the surface area of the potato which is illuminated is considerably larger than the diameter of the incident light beam. For example, a 2 mm helium-neon laser beam directed at a potato strip illuminates a surface area of the strip ten to thirty times larger than the diameter of the laser beam; the potato strip has the appearance of a miniature fluorescent lamp. However, when the concentrated light beam impinges upon a defect or impurity in the potato strip, which is opaque, or much less translucent than the pure potato material, there is very little or no diffusion of the light into the potato. As a result, the illuminated area of the potato is about equal to the diameter of the light beam, i.e., the illuminated area is much smaller than when the light beam strikes a pure region of the potato strip.

With this difference in illuminated area in mind, it was realized that if a sensing means is arranged to receive light reflected from an area of the potato strip considerably larger than the diameter of the incident light beam, the sensing means can detect a drop in the reflected light received when an impurity in the potato enters the light beam. This decrease in received light can be used to signal the presence of an impurity which should be removed.

The concept thus far described works well with a French cut potato strip which is already within the concentrated light beam. However, with a commercial apparatus wherein a series of potato strips move through a light beam and the field of view of a light sensor, so as to be checked for impurities, an "edge effect" problem manifests itself. Specifically, at the moment that the leading and trailing edges of each potato strip enter and leave, respectively, the light beam, the reflected light from the strip is reduced causing the sensing means to react as if an impurity had entered the beam. The reason that reflected light is reduced is that when only an edge of the potato strip is in the light beam, only the end portion of the strip is illuminated by light diffusion in the potato. Part of the incident light leaves through the end of the strip, and is not detected by the sensor. Thus, only a portion of the field of view of the light sensor is illuminated, bearing in mind that this field of view is larger than the diameter of the light beam. Consequently, the light sensor receives less light than when a portion of the potato strip between its ends is within the light beam.

It was thought that this edge effect problem could be overcome by providing a reflective background at a point spaced from both the light beam source and the light sensor, the potato strip being moved between the background, on the one hand, and the light source and sensor, on the other as it is checked for impurities. If the background has a reflectivity equal to that of the pure potato, the problem is not solved, since a drop in reflected light occurs when the leading edge of the potato strip enters the light beam, for the reason mentioned above, namely, because part of the light emerges through the end surface of the strip and this light cannot be seen by the sensor. It was suggested, therefore, that the background have a reflectivity substantially lower than that of the pure potato. In this case, when the leading edge of the potato strip enters the light beam, the light reflected toward the sensor actually rises, since the light diffusion into the end portion of the potato strip is greater than the light reflected from the background when no potato is present. Such a rise in reflected light will not be mistaken for an impurity, since an impurity causes a reduction in reflected light However, when the trailing edge of the potato strip is leaving the light beam, there will be a drop in reflected light intensity which will be seen by the sensor as an impurity. Hence the edge effect problem is still not solved.

It is another object of the present invention to provide an apparatus for detecting impurities in translucent bodies wherein the intensity of reflected light from a body changes appreciably when an impurity enters the concentrated light beam, but does not change, or changes only minimally, when the edges of the body enter and leave the light beam.

According to the invention, a background is provided which not only reflects incident light, but which is illuminated independently of the concentrated light beam source. The reflectivity of the background and the intensity of independent illumination of the background are selected so that the level of light received by the sensor remains relatively constant, whether or not a translucent body is in the concentrated light beam, even when only the leading or trailing edges of the body are in the light beam, but the level of light received by the sensor changing significantly when an impurity in the body enters the light beam.

It is a further object of the invention to provide such an apparatus capable of rapidly scanning the entire surfaces of numerous parallel rows of fast-moving translucent bodies to detect impurities thereon, and removing the impurities detected.

Additional objects and advantages of the present invention will be apparent from the following description in which reference is made to the accompanying drawings.

In the drawings:

FIG. 2 is a cross-sectional view through a conveyor carrying French cut potatoes taken transverse to the direction of travel of the conveyor;

FIG. 3 is a face view of a mirror forming part of the apparatus;

FIG. 4 is an end view of a multifaceted mirror;

FIG. 5 illustrates the relative sizes of the concentrated light beam diameter and the field of view of the light sensor;

FIG. 6 is a perspective view of the background element of the apparatus;

Figure 1:
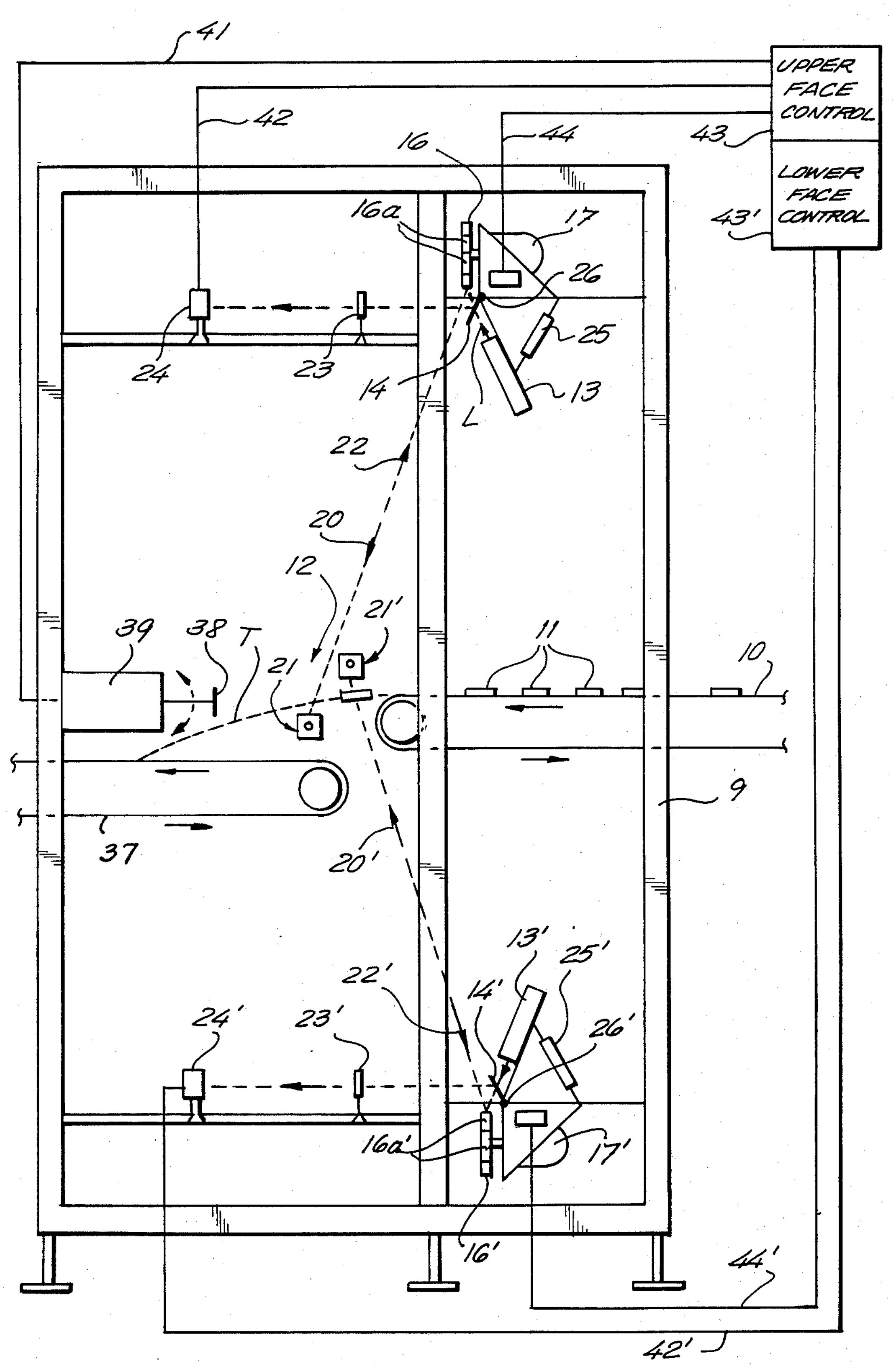
FIG. 1 is a schematic illustration of an apparatus, according to the invention, for detecting impurities in French cut potatoes, and for removing the impurities therefrom.

The apparatus chosen to illustrate the present invention, and illustrated in FIG. 1, includes a conveyor 10 for transporting French cut potato strips 11 toward an inspection station 12. The conveyor and other components of the apparatus are supported by a framework 9. The outer surface of conveyor 10 may be formed with a plurality of channels **10*a* (FIG. 2) extending in the direction of movement of the conveyor; for example, sixteen such channels may be provided across the width of the conveyor. A conventional device, such as a vibrating table (not shown) may be used to align the potato strips and deposit them into the channels 10*a*, as shown in FIG. 2. In this way, sixteen parallel rows of potato strips 11 are moved simultaneously toward inspection station 12**.

The apparatus includes means for directing a concentrated light beam into inspection station 12 and sensing light from the inspection station. A concentrated light beam source, such as a laser 13, is arranged behind a mirror 14 (FIG. 3) having a tiny hole or non-mirrored area 15 in it just large enough to allow the light beam to pass through it. The light beam L, indicated by a broken line, passes through hole 15 and strikes a multifaceted rotating mirror 16. Multifaceted mirror 16 is a polygon-shaped disk (see FIG. 4) having a plurality, say 12, mirrored facets **16*a* extending around its peripheral edge. At its center, mirror 16 is mounted on the shaft of an electric motor 17**, preferably a synchronous motor, which rotates the mirror at a constant high speed, e.g., several thousand rpm.

The light beam is reflected by multifaceted mirror 16 toward inspection station 12, as indicated by arrowhead 20, where it strikes a background 21. Light from the background returns along the same path, as indicated by arrowhead 22, to multifaceted mirror 16 which reflects the light toward the front face of mirror 14. The latter mirror reflects the light through a lens 23 to a light sensing element 24, such as a photomultiplier, capable of producing an electrical signal proportional to the intensity of light it receives. Laser 13 may be adjusted by a suitable mechanism 25 about a pivot axis 26, and mirror 14 may be adjusted about the same pivot axis, to insure that the light travels along the paths just described.

The field of view of light sensor 24 is much larger than the cross-sectional area of the light beam eminating from source 13. This is indicated in FIG. 5, wherein the inner circle 27 represents the light beam cross-sectional area, and the outer circle represents the field of view of sensor 24.

Because mirror 16 rotates about an axis parallel to the direction of travel of conveyor 10, the light beam 20 reflected from each facet **16*a* scans along a path transverse to the longitudinal direction of the conveyor. Background 21 is positioned along this path to receive the repeated light beam scans produced as each successive facet 16*a* moves into position to receive the light beam from source 13** and reflect it toward the background.

As shown in FIG. 6, background 21 may comprise an elongated, rectangular enclosure 31 housing an elongated light source, such as a fluorescent lamp 32, independent of light source 13. A filter 33 forming part of the top wall of enclosure 31 is preferably made of a blue transparent material, such as a suitable plastic, so that light from lamp 32 can pass through filter 33 and reach sensor 24 via mirrors 16 and 14. The length of filter 33 is at least about equal to the width of conveyor 10 so that the filter is in registry with the paths of all the potato strips 11 on the conveyor.

It has been found advantageous, for a reason to be mentioned below, to provide filter 33 with a slot 34 which extends along the path traced on the filter surface by the laser beam L due to rotation of mirror 16. Since light beam L approaches the filter surface at an angle, the path traced by the beam is in the shape of an arc, and hence slot 34 is arc-shaped. Preferably, the width of slot 34 equals the diameter of light beam L.

As shown in FIG. 1, background 21 is spaced in front of the forward end of conveyor 10, considering the direction of travel of the upper run of the conveyor. Beneath background 21 is the rear end of another conveyor 37, the upper run of which moves in the same direction as the upper run of conveyor 10. Conveyor 10 moves at a high enough speed so that as the potato strips 11 leave the forward end of the conveyor, they are tossed through the air, along trajectories indicated by broken line T, over background 21 and on to conveyor 37. The latter conveyor delivers the potato strips which reach it for further processing, such as freezing and packaging.

Before reaching conveyor 37, trajectories T pass a series of impurity removing devices. In the illustrated example, each such device includes a rotating knife blade 38 and a drive mechanism 39 for moving the rotating knife blade toward and away from the trajectory T. Preferably, there is a knife blade 38 aligned with each row of potato strips on conveyor 10. Thus, if there are sixteen rows of potato strips 11, there are sixteen knife blades 38, and a drive 39 for each blade. When an impurity is detected in a potato strip passing over background 21, the drive 39 allocated in the row in which that strip is located is activated to swing its respective rotating knife blade 38 downwardly so as to cut the impurity out of the potato strip during its free fall and before it reaches conveyor 37. Alternatively, knife blades 38 could be replaced with paddles, similar to those shown in U.S. Pat. No. 4,262,806. In such a case, activation of the appropiate drive 39 would cause its respective paddle to slap aside a potato strip containing a defect to prevent that strip from reaching conveyor 37.

Although potato strips 11 are propelled off conveyor 10 at high-speed, the scanning speed of light beam L is much greater due to the high speed of rotation of multifaceted mirror 16. Thus, during the time that one facet 16*a* causes the light beam to scan across background 21, each potato strip moves forward only a small increment. In fact, the amount of forward movement of each potato strip during each scan of the light beam is preferably equal to or less than the diameter of the light beam. Consequently, the entire surface area of each potato strip facing mirror 16 will surely be illuminated by the successive light beam scans produced by the successive facets of rotating mirror 16.

Since only the upper half of each potato strip 11 is illuminated by the light beam from laser 13, and reflects light to sensor 24, the components described thus far will not reliably detect impurities on the bottom surface of the potato strips. For this reason, it is advantageous to provide a second means for directing a concentrated light beam into inspection station 12 from the opposite direction and for sensing reflections of that light beam from the inspection station. These components are identical to those already described, and in FIG. 1 bear the same reference numerals as their counterparts, followed by a prime.

The benefit of having the potato strips travel through a free fall trajectory T will now be seen. Since during this time the strips are unsupported, both the top and bottom surfaces of the strips can be scanned by the light beams from sources 13 and 13' without obstruction.

At any instant of time, the light beam from source 13 strikes a facet 16*a* of mirror 16 and is reflected along a linear path to background 21. Assume that at the instant of time referred to, the linear path of the reflected light intersects the trajectory T of one of the rows of potato strips. The light received by sensor 24 at that instant of time will depend upon whether or not a potato strip is intersecting the light beam, and if a potato strip is in the light beam, whether or not the part of the potato in the beam carries an impurity. The effects of these different possibilities on the light intensity received by sensor 24 can be seen by referring to the graph of FIG. 7.

Figure 7:
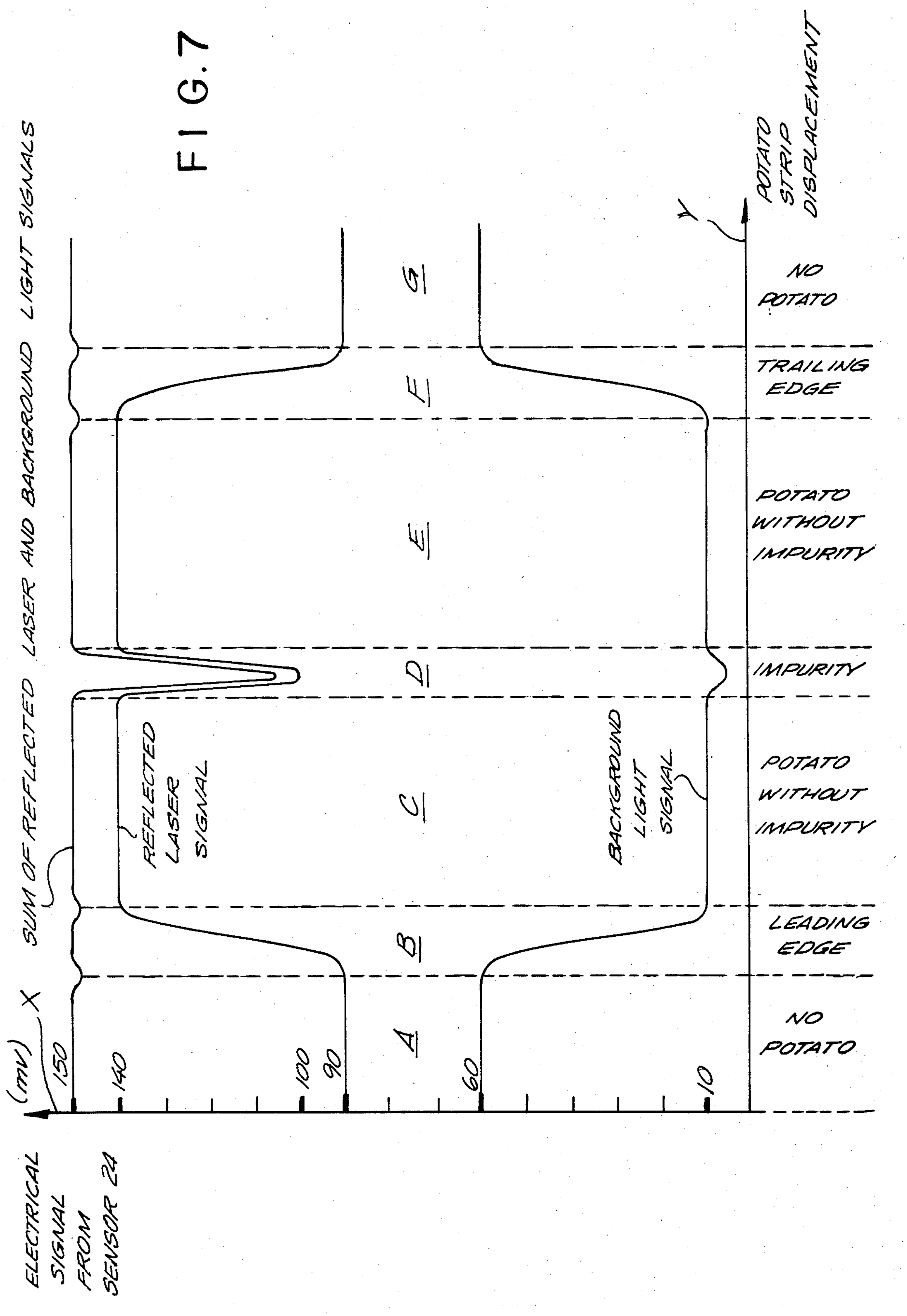
FIG. 7 is a graph representing intensity of light received by the light sensor.

The vertical axis X of FIG. 7 represents the electrical signal produced by sensor 24, which is proportional to the intensity of the light it receives. The horizontal axis Y represents forward displacement of a potato strip along trajectory T toward and through the light beam. As pointed out above, light beam scanning is so rapid that every part of each potato strip encounters the light beam.

At the left side of FIG. 7, in the zone identified by the letter A, no potato strip has yet entered the beam. The output of sensor 24 is, for example, a 150 millivolt signal. This signal results from the addition of two components: the reflection of the laser signal from the surface of filter 33 of background 21 causes a 90 mv output from sensor 24, and the light from fluorescent lamp 32 in background 21 causes a 60 mv output from sensor 24, the total of these two outputs being 150 mv. The filter 33 is selected so that the amount of light it reflects is less than that reflected when an edge of a potato strip is in the light beam. The intensity of fluorescent lamp 32, which is preferably powered by a D.C. source, is adjustable.

When the leading edge of a potato strip enters the concentrated light beam (zone B in FIG. 7) the reflection of the light beam from the potato rises from a minimum of 90 mv output from sensor 24, when the edge first enters the beam, to a 140 mv output from sensor 24 when the strip is completely within the light beam. This rise in reflected light intensity is due to the edge effect mentioned above, i.e., when the edge of the potato mentioned above, i.e., when the edge of the potato strip first enters the light beam, part of the light which diffuses into the potato material leaves the strip through its front end, and is not reflected back along path 22 to sensor 24. At the same time that reflected light intensity from the potato is rising to 140 mv, the intensity of light from lamp 32, in the background, traveling along path 22 toward sensor 24 is being diminished because that light is being progressively blocked by the potato. When the potato is completely within the light beam, the light from lamp 32 reaching sensor 24 falls to a level which causes sensor 24 to produce a signal of 10 mv. The reason the signal is not reduced to zero is that the potato is translucent, and hence permits some of the light from lamp 32 to get through to sensor 24. The combination of the 140 mv signal attributable to reflection of the light beam from the pure potato and the 10 mv signal attributable to transmission of light from source 32 through the potato equals a total output signal of 150 mv, i.e., substantially the same as that when no potato was in the light beam (zone A). Thus, the edge effect does not cause a reduction of signal which might be interpreted as an impurity.

As long as no inpurity in the potato enters the light beam, the output signal of sensor 24 remains at 150 mv (zone C), being a combination of reflected light of the beam from the pure potato within the field of view 28 (FIG. 5) of sensor 24 and the light from lamp 32 transmitted through the potato to sensor 24. Due to the translucent nature of the potato, the entire field of view 28 is illuminated, because the light diffuses throughout this area of the potato.

When an impurity carried by a potato strip enters the light beam, the output of sensor 24 decreases significantly (zone D). The reason is that the impurity, being of a darker color and more opaque than the pure potato, greatly reduces or eliminates diffusion of the light beam into the potato material, i.e., the area of illumination of the potato collapses from one which filled the field of view 28 of sensor 24 to one which is about equal to the cross-sectional area 37 of the light beam. Hence, the diffused light within the field of view 28 is greatly reduced, and reflection of the light beam from the potato falls to, say, 100 mv. At the same time, an impurity transmits less light from source 32 to sensor 24, and hence this light intensity reaching sensor 24 falls to, say, 5 mv. Consequently, the total output signal from sensor 24 when an impurity is within the light beam drops to, say 105 mv.

Once the impurity passes out of the light beam, the output signal rises again to 150 mv (zone E) just as it was before the impurity entered the light beam (zone C). When the trailing edge of the potato strip passes through the laser beam (zone F), the reflected laser light decreases from 140 mv to 90 mv, because some of the diffused light in the potato leaves through the trailing end of the potato strip and is not seen by sensor 24. Simultaneously, the potato strip progressively blocks less and less light from background lamp 32, so that its light received by sensor 24 causes the output signal to rise to 60 mv. Thus, the total output signal of sensor 24 remains relatively steady at 150 mv as the trailing edge of the potato strip passes through the light beam.

After the potato strip leaves the light beam (zone G), the combination of reflected light of the laser beam and the light from background lamp 32 causes an output signal of 150 mv, as they did before the potato strip entered the beam (zone A).

The importance of the field of view 28 (FIG. 5) of sensor 24 being larger than the cross sectional area 37 of the laser beam will be appreciated.

It is primarily because the field of view 28 is larger that sensor 24 can detect reduction or collapse of the light diffusion in the potato, and hence detect an impurity. If the field of view 28 were equal to the laser area 27, the reduction in light diffusion in the potato, when an impurity enters the beam, would not be detected by sensor 24.

As mentioned above, filter 33 of background 21 is preferably formed with a slot 34. Performance of the apparatus is improved by use of the slot. By adjusting the intensity of lamp 32, the background light can more easily be matched precisely to the amount of light reflected from a pure potato strip, rather than relying on a combination of light from lamp 32 and reflected light from filter 33. As a result, when the potato strip enters the light beam, the amount of light from background lamp 32 which it progressively cuts off is almost exactly matched by the progressive increase in reflected light from the potato. If the slot is made wider than the diameter of the laser beam, sensor 24 will produce a small negative signal when an edge of the potato strip is in the beam, thereby making the system less sensitive to small impurities in the potatoes.

Electrical signals from sensor 24 are applied by line 42 (FIG. 1) to an upper face control unit 43. In addition, reference signals are transmitted by motor 17 along line 44 to control unit 43. The reference signals may constitute one pulse per revolution of multifaceted mirror 16. Similarly, electrical signals from sensor 24' and reference signals from motor 17' are applied to a lower face control unit 43'. The terms "upper face" and "lower face" refer, of course, to the upper and lower surfaces of the potato strips scanned by beams from sources 13 and 13', respectively. In response to the signals received by the control units 43 and 43', these units provide signals along lines 41 (only one being shown) for activating the appropriate removing device drives 39 for removing impurities from the potato strips or removing the strips which contain impurities.

Figure 8:
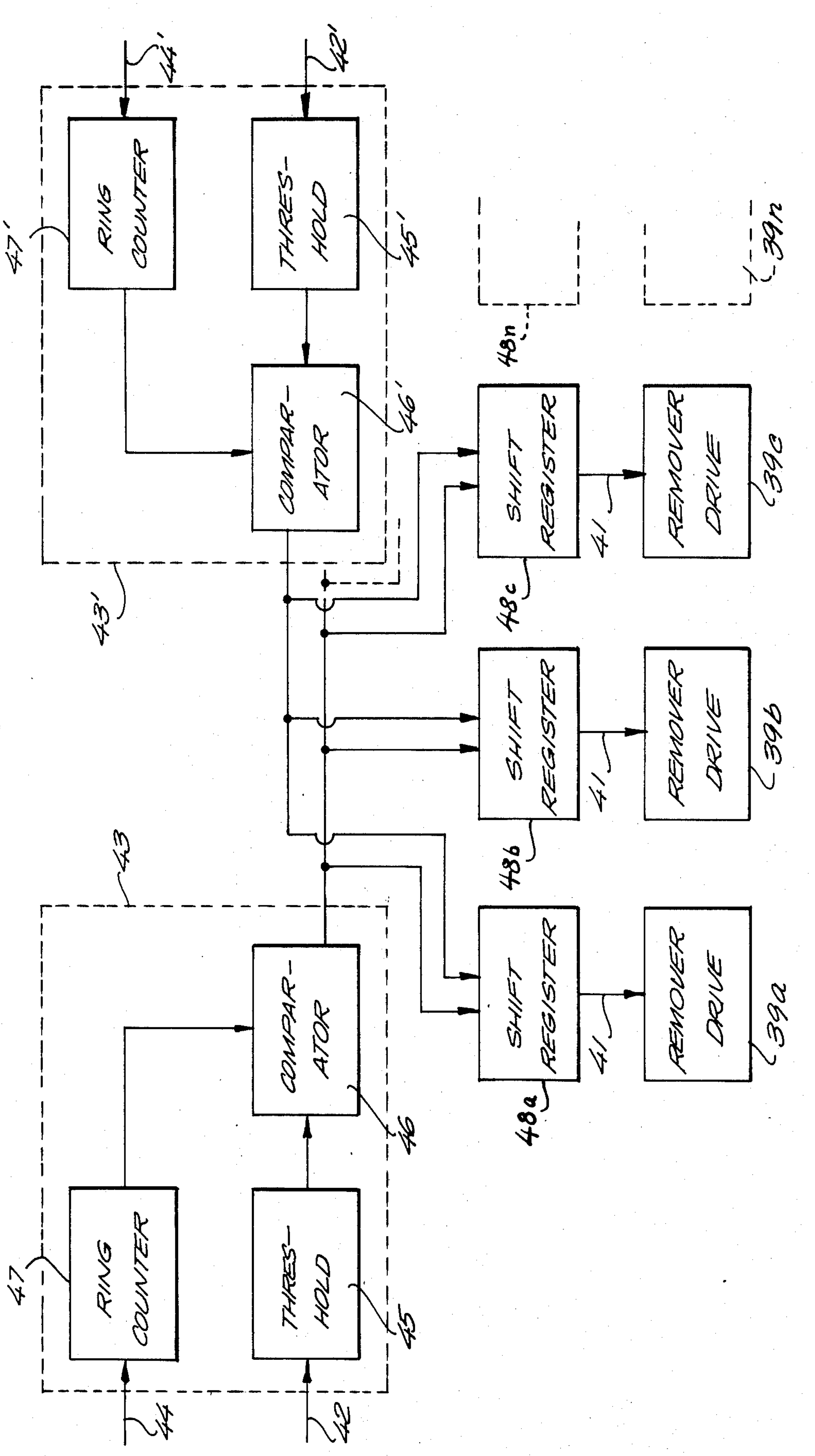
FIG. 8 is a block diagram illustrating the electronic circuitry for operating the impurity removing mechanism.

FIG. 8 illustrates in more detail the electronic control units 43 and 43'. Control unit 43 includes an impurities detector circuit 45, which may be a threshold circuit, for receiving the electrical signals from sensor 24 along line 42. When these signals are on the order of, for example, 150 mv, indicating either no potato in the scanning beam L or a pure potato in the beam, circuit 45 produces no output. However, when an impurity causes the output of sensor 24 to change, in the present example this means a reduction in the output signal, circuit 45 applies a signal to an impurity location circuit 46, which may be a comparator.

Control unit 43 also includes a ring counter 47 for receiving the pulses from motor 17 along line 44. The output of ring counter 47 is also applied to comparator 46. Since the pulses from motor 17 are produced once during each revolution of the motor and hence of multifaceted mirror 16, the pulse is an indication of the angular orientation of mirror 16 at the instant the pulse is produced. Therefore, the motor pulse is also an indicator of the location of the laser beam at that instant, i.e., the pulse identifies which of the sixteen trajectories T, through which the sixteen rows of potato strips on conveyor 10 are tossed, the beam intersects at that instant. Thus, when comparator 46 receives a signal from threshold circuit 45, indicating detection of an impurity, comparator 46 produces a signal indicative of the particular row of potato strips in which the impurity was detected.

Each output signal from comparator 46 is applied to one of a series of time delay devices, such as shift registers. There are as many shift registers as there are rows of potato strips; thus in the present example sixteen shift registers are furnished. Each shift register is allocated to one of the rows of potato strips on conveyor 10, e.g., shift register **48*a* is allocated to the first row of potato strips, shift register 48*b* to the second row, and so forth. Each output signal from comparator 46 is applied to the particular shift register 48 allocated to the row of potato strips in which the impurity was detected After a time delay equal to the time required for any point on a potato strip to move from the plane in which the laser beam scans back and forth to the plane of rotating knife blade 38, or other impurity removing element, the shift register which received the signal from comparator 46 sends a signal to the particular drive 39 allocated to the row in which the impurity was detected. For example, if the impurity was detected in the second row of potato strips, shift register 48*b* receives a signal from comparator 46, and after the time delay described above, sends a signal for energizing drive 39*b*. The knife blade controlled by drive 39*b*** is thereby actuated to cut the impurity from the potato strip.

In other words, when an impurity is detected by sensor 24, comparator 46 produces a signal indicative of the row of potato strips in which the impurity was located. Then, after a time delay equal to the time needed for the impurity to travel from the point at which it was detected, namely, the plane in which the scanning laser beam moves, to the point at which the impurity removal device 38 is operative, the drive 39 which controls the device 38 aligned with the row in which the impurity was detected operates that device 38 to remove the impurity.

Control unit 43' operates in precisely the same manner as described above. However, the plane in which the beam from laser 13' scans is located at a distance from knife blades 38 different from the distance between the beam from laser 13 and the knife blades. Therefore, a different amount of time delay is required before operating knife blades 38 when an impurity is detected in the lower surface of a potato strip than when it is detected in the upper surface. Consequently, comperator 46′ operates the shift registers 48 through a separate set of imputs, as a result of which each shift register provides a different time delay, depending upon whether it receives a signal from comparator 46 or comparator 46′.

Although not shown in FIG. 8, it will be desirable to include in each control unit 43 and 43′, between the input signal on line 42 and threshold circuit 45, an amplifier and filter, and an automatic gain control. The latter serves to provide a constant output signal despite slow changes of the input signal caused over long periods of time by, for example, dirt accumulating on the mirrors and lenses of the apparatus.

This invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An apparatus for detecting impurities in translucent bodies, comprising:

(a) a source for producing a concentrated light beam, the light beam having a relatively small cross-sectional area, (b) transport means for moving translucent bodies through the light beam, light from the source impinging upon a pure translucent body being diffused within the body so as to illuminate a surface area of the body larger than the cross-sectional area of the light beam, but light from the source impinging upon an impurity in the translucent body being diffused to a lesser extent, (c) receiving means for receiving light from the translucent bodies, the receiving means having a field of view much larger than the cross-sectional area of the light beam so that the receiving means receives less light when the beam impinges upon an impurity than when the beam impinges upon the translucent body without impurities, and the receiving means producing a signal proportional to the intensity of the light it receives, and a mirror operatively interposed between the concentrated light beam source and the transport means, the light beam passing through an opening in the mirror, and the mirror being arranged to reflect light, from translucent bodies passing through the beam, to the receiving means.

2. An apparatus for detecting impurities in translucent bodies, comprising:

(a) a source for producing a concentrated light beam, the light beam having a relatively small cross-sectional area, (b) means for causing the concentrated light beam to repeatedly scan along a path, the scanning means including a multifaceted mirror and means for rapidly rotating the mirror to sequentially bring each facet into the concentrated light beam, (c) transport means for moving a plurality or rows of transluent bodies simultaneously through the light beam path in a direction transverse to the path, light from the source impinging upon a pure translucent body being diffused within the body so as to illuminate a surface area of the body larger than the cross-sectional area of the light beam, but light from the source impinging upon an impurity in the translucent body being diffused to a lesser extent, (d) receiving means for receiving light from the translucent bodies, the receiving means having a field of view much larger than the cross-sectional area of the light beam so that the receiving means receives less light when the beam impinges upon an impurity than when the beam impinges upon the translucent body without impurities, and the receiving means producing a signal proportional to the intensity of the light it receives, and (e) a planar mirror operatively interposed between the multifaceted mirror and the receiving means, so that each facet at the time it reflects the concentrated light beam toward the translucent bodies also reflects light from the translucent bodies toward the receiving means via the planar mirror.

* * * * *